Jan. 26, 1926.　　　　　　　　　　　　　　　　　1,570,938
M. J. BUTLER ET AL
COMBINED SIGHT GAUGE AND THERMOMETER
Filed August 1, 1923
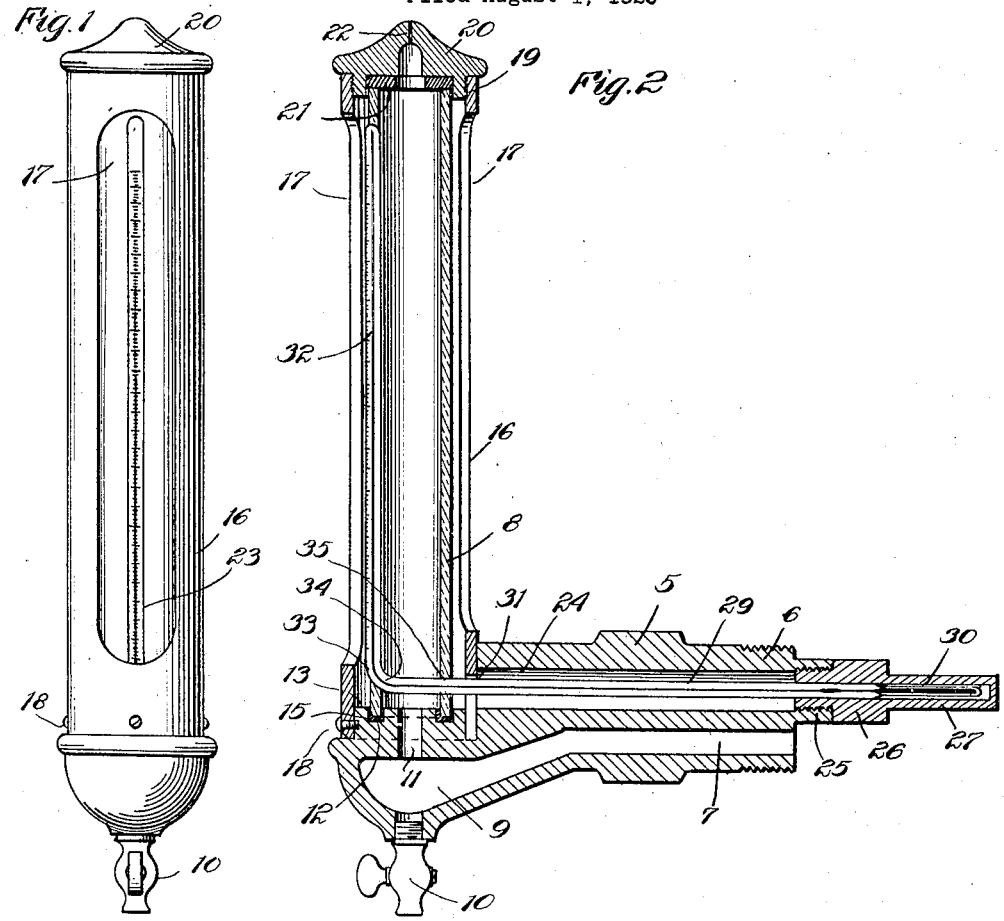
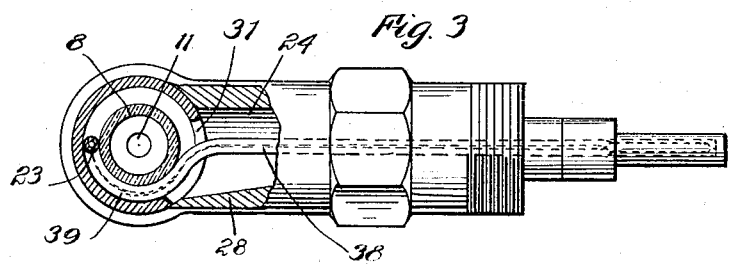
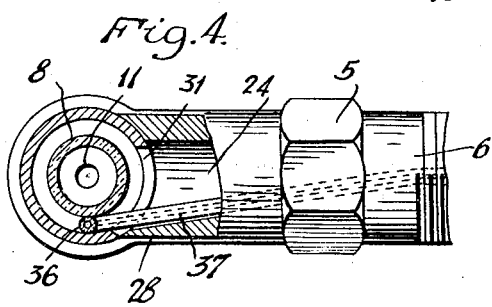
Inventors
Matthew J. Butler
Elmer A. Johnson Patented Jan. 26, 1926.

1,570,938

UNITED STATES PATENT OFFICE.

MATTHEW J. BUTLER AND ELMER A. JOHNSON, OF JOLIET, ILLINOIS.

COMBINED SIGHT GAUGE AND THERMOMETER.

Application filed August 1, 1923. Serial No. 654,984.

*To all whom it may concern:*

Be it known that we, MATTHEW J. BUTLER and ELMER A. JOHNSON, citizens of the United States, residing at Joliet, in the county of Will and State of Illinois, have invented a certain new and useful Combined Sight Gauge and Thermometer, of which the following is a specification.

This invention relates generally to liquid level gauges combined with a thermometer. It is frequently desirable to know the level of a liquid and its temperature at the same time, and for this purpose we have constructed a unitary device to indicate both of these. Heretofore, thermometers have been used in connection with level indicators, but these have been open to the objection that the thermometer records the temperature in the level gauge, or that a flow of liquid past the thermometer is required to register the desired temperature. In other devices the utility is limited to open vessels wherein the level is indicated by the position of a float.

In our invention we provide a unitary structure containing a thermometer, the bulb of which is situated at the point where the temperature is desired.

One object of our invention is to provide a liquid level gauge of the usual type containing a vertically reading thermometer the stem of which can be angular to follow the lines of the gauge.

Another object is to place the bulb at the innermost point of the device and to protect the same from breakage.

Another object is to provide a separate channel in the gauge members to receive the thermometer and to carry the bulb freely into the interior of the system being observed.

In the drawings, we have disclosed a form which is suitable for observing the level and the temperature of oil in a transformer or in a machine bearing. Figure 1 shows a front view of the device with the thermometer and oil level readily visible. Fig. 2 shows a side view in section of Fig. 1, with the thermometer glazed into the level glass. Fig. 3 is a plan view partly in section.

Fig. 4 is a modification of the relation between the thermometer and the bracket.

In our invention we provide a new form of bracket member adapted to transmit an indication of temperature and liquid level from one end to the other. In the drawings the bracket member 5 illustrates one form of this part of the invention. It is adapted by the screw threaded end 6 to be screwed into a wall of a vessel or casing having the liquid therein. As in the ordinary level gauge there is a passageway 7 communicating from the interior of the vessel to the level gauge 8.

Any transparent material suitable for the liquid to be held therein may be used in the level gauge. Ordinarily this is glass and hereinafter it will be referred to as glass, but can be of other material if required. In the form shown we have dispensed with the usual valve in a level gauge, but have provided a draining basin 9 and a pet cock 10 to remove the liquid from the gauge or to remove sediment. The arrangement we have used provides for placing the pet cock vertically in line with the level gauge 8, the inside of which communicates to the basin 9 by the opening 11. It is thus an easy matter to clean a dirty gauge by removing the pet cock without removing the gauge.

Any desired method may be used to attach the gauge glass 8 to the bracket. In Fig. 2, we show the glass 8 set into an annular channel 12 on the seat 13 of the bracket member 5. A cement or packing means 15 is used to make a seal, as is required.

In any such gauge it is necessary to protect the gauge against breakage by a casing or framework extending along the glass tube. Where a single bracket member is used to support the tube the protecting means serves also to hold a cap for the gauge glass and to retain it in the bracket member.

In our device we have provided a tubular casing member 16 as the protecting means. The seat 13 is made circular to receive the tubular member 16, removably held to the seat by the screws 18.

The casing 16 is provided with openings 17 to render the gauge visible. The top of the casing is screw threaded at 19 to receive the cap 20 which is screwed therein to cover the top of the gauge and to hold it fixed. A packing or gasket 21 is interposed between the glass 8 and the cap 20. A vent 22 is provided in the cap.

The above features relate generally to the liquid level gauge. But our bracket member likewise has other means to permit access to the interior of the vessel in order to cause registration of the temperature within at a point visible substantially in the line of the level gauge. In the drawings the bracket 5, in part described above, has been so adapted that this means combined therein makes a compact and unitary structure.

The circular seat 13 is preferably chosen on a diametral plane of the bracket member as shown because here it is of greater area. Below the plane of seat 13 is the passageway 7 and above it we provide a second passageway 24 with a threaded extension 25 as a part of the bracket. This would ordinarily communicate to the liquid in the vessel, but we prefer to have it closed off by a hollow screw cap 26 having the thin walled extension 27. The passageways 24 is shown with a substantial width near the front end and may be tapered narrowing towards the back, as indicated by the wall 28 in Fig. 3.

The purpose of this upper closed passageway is to receive a thermometer stem 29 with the bulb 30, the bulb being rearmost in the bracket and protected by the extension 27. The extension is sufficiently long so that the bulb assumes the temperature of the surrounding liquid and so registers the true temperature. The purpose of the thin wall protector is three-fold. Primarily it protects the bulb from breakage, but in addition it closes the passageway 24 to the liquid, permitting the front end of the passageway to be open as shown at 31. A third purpose of the extension 27 is to keep the liquid away from the thin glass of the bulb. At higher temperatures, many solutions exert a solvent action on glass which is appreciable over a period of time. In such a case the thin glass of the thermometer bulb would soon be eaten away and serious consequences might ensue. It would at least entail labor and expense for a renewal.

In the drawings we have provided two general methods of inserting the thermometer. In Figs. 1 and 2 the thermometer 23 is represented as glazed into the gauge glass 8, the line 32 representing a glazing joint. At 33 a right angled bend is made in the thermometer and the stem portion 29 extends thru the glass diametrically, and is sealed or integral therewith at 34 and 35.

In Fig. 3 we have designated other positions for the thermometer which give additional features to the device as a whole. The upright position of the thermometer is indicated in section by the numeral 23 in front of the gauge glass 8, the two being here separate members.

In Fig. 4, the circular section 36 indicates the vertical portion of the thermometer positioned at any other point about the periphery of the gauge glass 8. As shown, it is located at the side thereof permitting an angular and direct extent of the thermometer stem 37 rearwardly in distinction to the curved form shown at 39 in Fig. 3.

In whatever position the thermometer is placed it is understood that suitable openings in the casing are provided for visibility. The thermometer in Fig. 4 has fewer bends and can be readily removed and inserted without removal of the gauge glass from its seat 13. It may also be desirable at times to remove the thermometer and to insert a recording thermocouple, or other temperature-sensitive devices.

Having described one embodiment of our invention for the purpose of illustration, we desire that the disclosure of the drawings and the above description in no way limit the invention short of the terms of the appended claims.

We claim as our invention:

1. A unitary liquid level gauge and thermometer having, in combination, a bracket member adapted to be secured to a vessel containing a liquid, a level glass secured to said bracket, said bracket having a passageway therein communicating from the level glass to the interior of the vessel, said bracket having also a second passageway therein, a tubular member rigid with said bracket having its opening alined with said second passageway, and means to close said second passageway at said tubular member, said second passageway and said tubular member being adapted to house a thermometer adapted to have its bulb in said tube.

2. In a liquid level gauge having at the front a sight glass, a bracket carrying said sight glass, said bracket having one passageway through the bracket to the sight glass and also a second passageway open at its front end, and means to close the second passageway at its rear end, said means being adapted to extend the length of the second passageway to the rear, said second passageway and said extending means being adapted to house a temperature-sensitive device.

3. In a liquid level gauge for a vessel, a supporting member with a passageway therein for the liquid and having also a second passageway alongside the first to extend into the interior of the vessel, a tubular cap adapted to be positioned inside the vessel to close the second passageway from communication to the interior of the vessel, said second passageway being adapted to house a temperature-sensitive device.

4. A unitary liquid level gauge and thermometer for a vessel having, in combination, a sight glass, a bracket member having a seat to support the sight glass, said bracket being hollow forming a basin lowermost inside the bracket, a valve communicating to said basin, said seat having an opening therein over said valve communicating from the basin to the sight glass, said bracket having a passageway therein adapted to communicate from the basin to the interior of the vessel, and also a second passageway in the bracket open at both ends, said second passageway having internal screw threads at the vessel end of said bracket, and screw threaded means to extend and to close said second passageway whereby to form a chamber adapted to hold a temperature-sensitive device.

5. A unitary liquid level gauge and thermometer for a vessel having, in combination, a sight glass with a thermometer glazed therein, the stem of the thermometer passing through the glass and extending at right angles thereto, a bracket support for the sight glass adapted for connection with the vessel, a seat on said bracket to receive the glass, packing means between the glass and the seat, said bracket having a passageway therein communicating from the glass through the seat to the end fitting the vessel, and having also a second passageway alongside the first passageway, means to extend and close the second passageway at the vessel end of the bracket, the stem of said thermometer being adapted for insertion into said second passageway with the bulb of said thermometer located in the passage closing means.

6. A unitary liquid level gauge and thermometer for a vessel, having, in combination, a bracket member, a casing on said bracket member and secured thereto, a removable cap with a vent therein secured to the top of said casing, a sight gauge glass held between said bracket and cap, packing means interposed between the gauge glass and the cap and bracket, said bracket having a passageway therethrough to the gauge glass, and having also a second passageway alongside the first passageway communicating at one end to the space between the gauge glass and the casing, means to extend and close the other end of the second passageway, a bent thermometer in the second passageway having its bulb in the extending means and its scale alongside the gauge glass, there being suitable openings in the casing whereby the temperature and level of a liquid in the vessel is visibly registered.

7. In a liquid level sight gauge for a vessel having a sight glass and a supporting bracket member attached to the vessel, a thermometer, and means for containing said thermometer, comprising an open ended passageway through the bracket to receive the thermometer, means to extend and close said passageway at a point within the vessel, said means being a relatively thin casing adapted to house the bulb of the thermometer, the open end of the passageway being adjacent the sight glass, and the thermometer being suitably bent whereby the scale is alongside the sight glass.

8. A unitary liquid level gauge and thermometer for a vessel comprising, in combination, a bracket member adapted to be secured to the vessel, a casing on the bracket and secured thereto, a removable cap secured to the top of the casing, the bracket having a seat thereon and a passageway through said seat to the vessel, and having also a second passageway alongside the first above said seat, means adapted to be within the vessel screwed to the bracket, to extend and to close the second passageway, a unitary level gauge glass and thermometer, the scale of the thermometer being a part of the wall of the gauge glass, the stem of the thermometer being at right angles to the gauge glass and situated above the end thereof, and means on the cap and seat to hold the gauge glass therebetween over the hole in the seat, the stem of the thermometer being in the second passageway with its bulb in said extending means.

In testimony whereof we have hereunto affixed our signatures.

MATTHEW J. BUTLER.
ELMER A. JOHNSON.